United States Patent
Silverbrook et al.

(10) Patent No.: US 6,553,459 B1
(45) Date of Patent: Apr. 22, 2003

(54) MEMORY MODULE FOR COMPACT PRINTER SYSTEM

(75) Inventors: Kia Silverbrook, Balmain (AU); Simon Robert Walmsley, Epping (AU)

(73) Assignee: Silverbrook Research Pty Ltd, Balmain (*) Notice: Subject to any disclaimer, the term of this patent is extended or adjusted under 35 U.S.C. 154(b) by 0 days.

(21) Appl. No.: 09/575,166

(22) Filed: May 23, 2000

(30) Foreign Application Priority Data

May 25, 1999 (AU) ............................................... PQ0560

(51) Int. Cl.[7] .............................................. G06F 12/00
(52) U.S. Cl. ......................................... 711/115; 400/88
(58) Field of Search ............................. 400/88; 711/115

(56) References Cited

U.S. PATENT DOCUMENTS

| | | | |
|---|---|---|---|
| 4,727,245 A | | 2/1988 | Dobbins et al. |
| 5,806,997 A | | 9/1998 | Kawanabe |
| 5,914,737 A | | 6/1999 | Silverbrook |
| 6,152,619 A | * | 11/2000 | Silverbrook .................. 400/88 |
| 6,158,907 A | * | 12/2000 | Silverbrook et al. ........... 53/412 |
| 6,195,513 B1 | * | 2/2001 | Nihei et al. .................. 396/332 |
| 6,405,055 B1 | * | 6/2002 | Silverbrook et al. ......... 455/556 |
| 6,473,728 B1 | * | 10/2002 | Tognazzini ..................... 704/3 |
| 2001/0055121 A1 | * | 12/2001 | Omura et al. ................ 358/1.9 |
| 2001/0055983 A1 | * | 12/2001 | Ohmura et al. .............. 455/566 |
| 2002/0140993 A1 | * | 10/2002 | Silverbrook et al. ......... 358/473 |

FOREIGN PATENT DOCUMENTS

| | | |
|---|---|---|
| EP | 978799 A2 | 2/2000 |
| JP | 62-05147 A | 7/1994 |
| WO | WO 92/10058 | 6/1992 |

* cited by examiner

*Primary Examiner*—Kevin Verbrugge

(57) ABSTRACT

A memory module useful in a digital imaging system such as a compact printer system. The memory module includes an image processor that compresses an image read from an image source, such as a camera module or a printer module. The compressed image is stored in a flash memory. Images stored in the flash memory may be decompressed and transferred to the printer module, or other modules. The memory module preferably incorporates two connection means. One or other of the connection means connect to modules of the compact printer system and the other connection means allows further memory modules to be stacked. The connection means includes a physical connection and a logical connection. The logical connection is a serial bus that communicates power and data.

Buttons are provided to select images, store images from and transfer images to the printer module. Images may be accessed at full resolution or thumbnail resolution. Feedback is provided via a LCD.

23 Claims, 12 Drawing Sheets

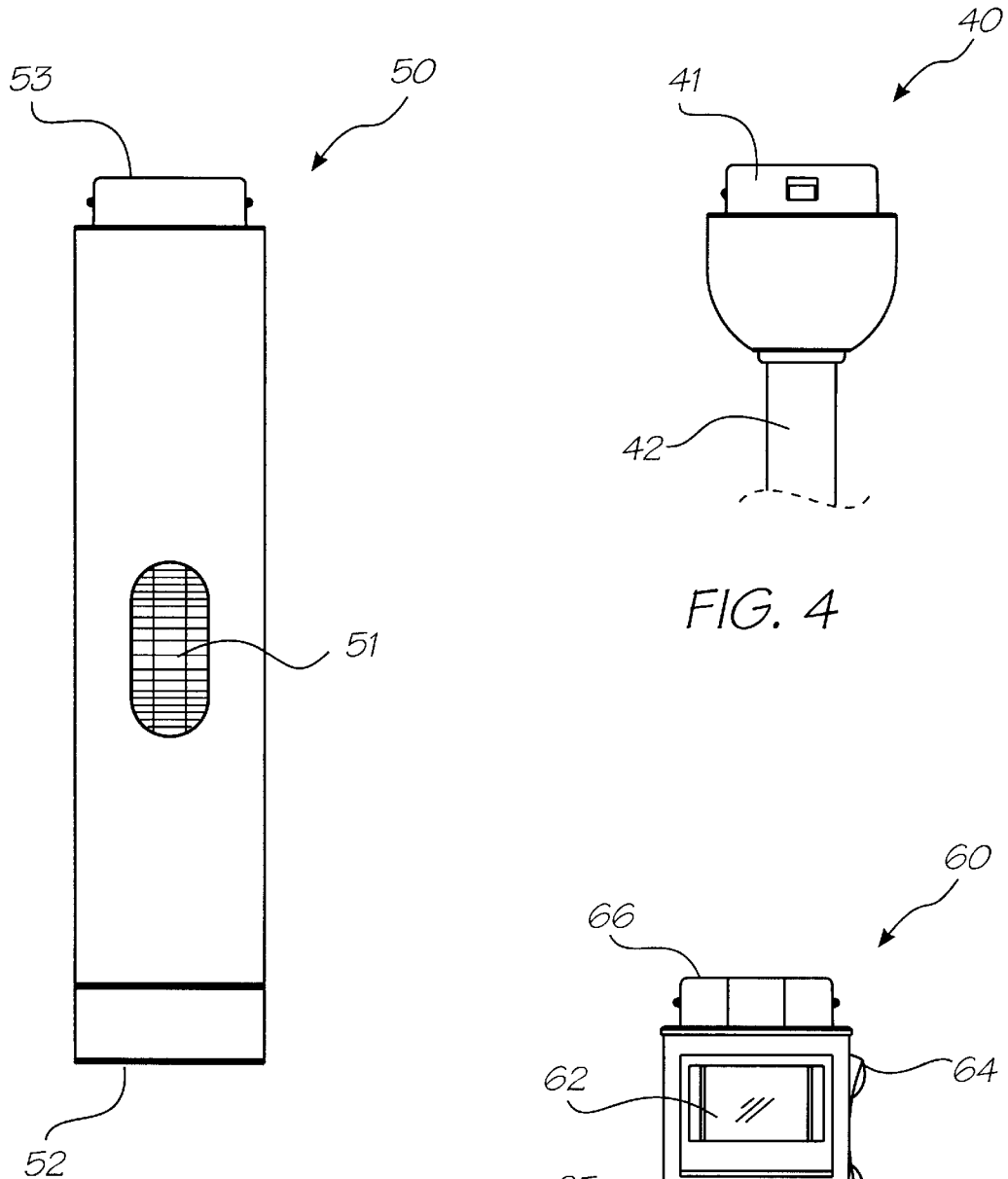

MEMORY MODULE FOR COMPACT PRINTER SYSTEM

FIELD OF THE INVENTION

The invention relates to a memory module useful in a digital imaging system. It is useful for storing images captured by a digital image sensor or camera. The memory module finds particular application in a compact printer system able to print full-color, business card size documents from a device about the size of a pen.

Reference may be had to co-pending applications claiming priority from Australian Provisional Patent Application number PQ0560 dated May 25, 1999. The co-pending applications describe related modules and methods for implementing the compact printer system. The co-pending applications are as follows:

| U.S. Ser. No. | Docket No. | Title |
| --- | --- | --- |
| 09/575,182 | PP01 | Compact Color Printer Module |
| 09/575,173 | PP02 | Modular Compact Printer System |
| 09/575,194 | PP03 | Nozzle Capping Mechanism |
| 09/575,136 | PP04 | Ink Cartridge for Compact Printer System |
| 09/575,119 | PP07 | Controller for Printer Module |
| 09/575,135 | PP08 | Camera Module for Compact Printer Sytem |
| 09/575,157 | PP09 | Image Processor for Camera Module |
| 09/575,134 | PP11 | Effects Module for Compact Printer System |
| 09/575,121 | PP12 | Effect Processor for Effects Module |
| 09/575,137 | PP13 | Timer Module for Compact Printer System |
| 09/575,167 | PP15 | Color Conversion Method for Compact Printer System |
| 09/575,120 | PP16 | Method and Apparatus of Dithering |
| 09/575,122 | PP17 | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States Patent Applications filed simultaneously to the present application and hereby incorporated by cross reference:

| U.S. Ser. No. | Docket No. | Title |
| --- | --- | --- |
| 09/575,152 | MJ62 | Fluidic seal for an ink jet nozzle assembly |
| 09/575,141 | IJ52 | Ink jet printhead having a moving nozzle with an externally arranged actuator |
| 09/575,125 | IJM52 | Method of manufacture of an ink jet printhead having a moving nozzle with an externally arranged actuator |
| 09/575,176 | MJ63 | Ink jet printhead nozzle array |
| 09/575,147 | MJ58 | Nozzle guard for an ink jet printhead |

It is known in compact devices such as cameras to provide on-board memory for storage of captured images. It is also known to have replaceable memory, for example, in the form of flash cards that can be removed from the camera for temporary storage. The problem with the replaceable memory is that a given memory slot on a digital camera can only accommodate a single memory card, and the single memory card can only store a certain number of images. If more images need to be stored or accessed, the memory card must be pulled out and a different memory card must be inserted. The combined memory of multiple memory cards cannot be used simultaneously. Also existing replaceable memory solutions only provide access in terms of a single image at a time. It is desirable to combine replaceable memory storage facilities as well as provide more varied access to images, for example, a single image containing a set of thumbnails of multiple stored images.

SUMMARY OF THE INVENTION

In one form, the invention resides in a memory module for a compact printer system comprising:

a body directly connectable to the compact printer module, said printer module comprising an elongate body having a length just larger than a length of a side of a business card such that said business card passes through said compact printer module for printing thereon, said body being substantially shorter than said compact printer module;

memory means within said body for storing images;

an image processor within said body that transfers one or more images from said memory means or to said memory means from an image source external to said body; and at least one connection means incorporated in said body that directly connects said memory module to said compact printer module, said connection means including a bus providing power and data between said memory module and said image source.

In a further form, the invention resides in a memory module for a compact printer system comprising;

a body directly connectable to the compact printer module, said printer module comprising an elongate body having a length just larger than a length of a side of a business card such that said business card passes through said compact printer module for printing thereon, said body being substantially shorter than said compact printer module;

memory means within said body for storing images;

an image processor within said body connected to said memory means that transfers one or more images from an image source external to said body to said memory means and transfers one or more stored images from said memory means to said printer module;

at least one connection means at an end of said body that directly connects said memory module to said compact printer module, said connection means including a bus providing power and data between said memory module, said image source and said printer module.

One or more images from an image source external to said body, to said memory means and transfers one or more stored images from said memory means to a printer module; at least one connection means at an end of said body for connecting said memory module to a bus providing power and data between said memory module, said image source and said printer module.

In a still further form the invention resides in a method of storing images in a compact printing system comprising the steps of capturing an image in an image source external to a memory module and storing said image: reading an stored image from a first storage location to an image processor in said memory module; applying compression or decompression to said stored image; and writing a resultant image to a second storage location.

Further features of the invention will be evident from the following description.

BRIEF DESCRIPTION OF THE DRAWINGS

In order to assist with describing preferred embodiments of the invention, reference will be made to the following figures in which:

FIG. 4 is a communication module;

FIG. 5 is a flash module;

FIG. 6 is a timer module;

DETAILED DESCRIPTION OF THE PREFERRED EMBODIMENTS

The invention is described in terms of the application to a compact printer system. It will be understood that the invention is not limited to this particular application but rather can be employed with any digital imaging system. Nonetheless, the compact printer system provides a convenient environment in which to describe the details of the memory module invention.

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 2:
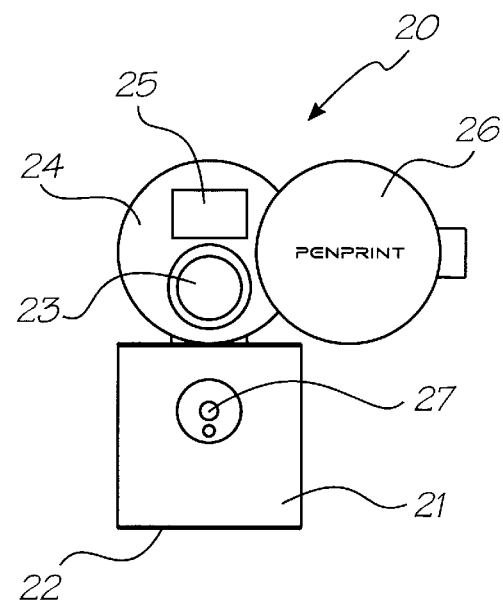
FIG. 2 is a camera module.
Figure 3:
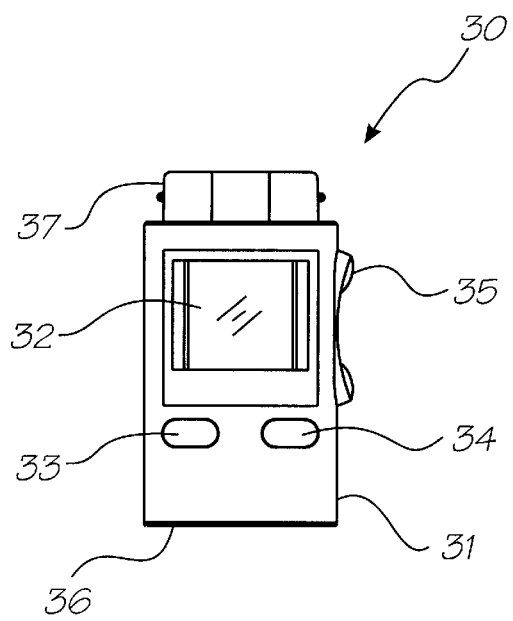
FIG. 3 is a memory module.
Figure 7:
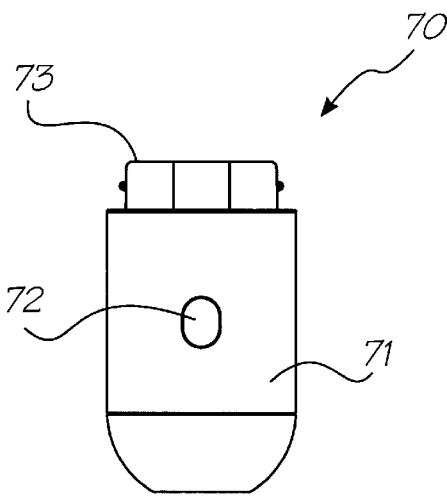
FIG. 7 is a laser module.

Compact printer modules can be grouped into three types:

image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;

housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
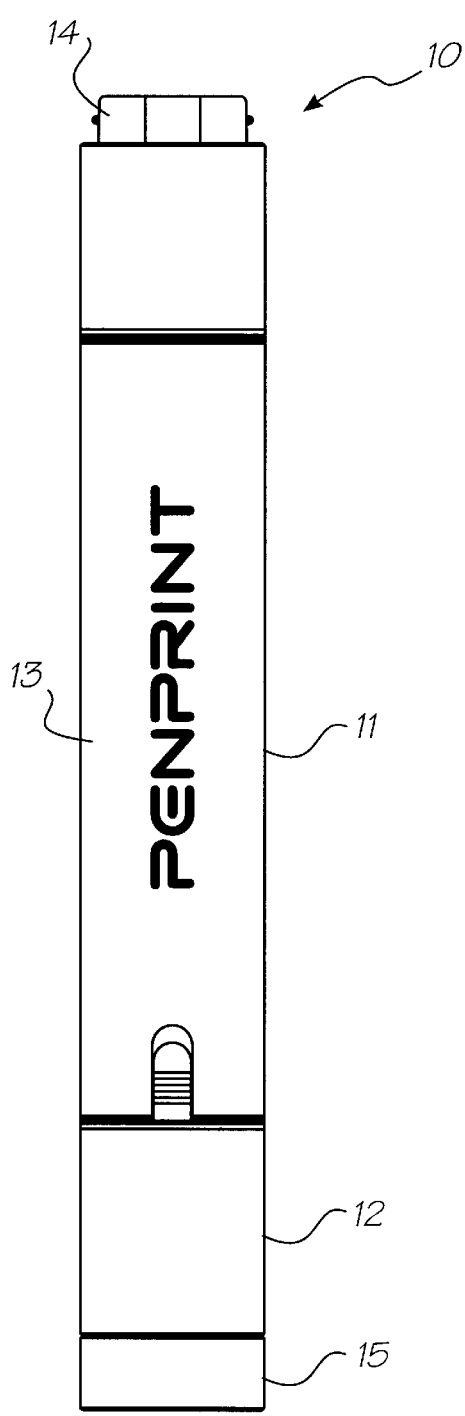
FIG. 1 is a printer module.

FIG. 1 shows a printer module that incorporates a compact printhead described in co-pending United States Patent Applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 $\mu$m in diameter, and spaced 15.8751 $\mu$m apart. Because the printing is bi-level, the input image should be dithered or error-diffused for best results. Typically a Memjet printhead for a particular application is page-width. This enables the printhead to be stationary and allows the paper to move past the printhead.

A Memjet printhead is composed of a number of identical ½ inch Memjet segments.

The printer module 10 comprises a body 11 housing the Memjet printhead. Power is supplied by a three volt battery housed in battery compartment 12, The printhead is activated to commence printing when a business card (or similar sized printable media) is inserted into slot 13, Male connector 14 and female connector 15 facilitate connection of other modules to the printer module 10.

FIG. 2 shows a camera module 20, The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, optional LCD 32, IN button 33, OUT button 34 and SELECT button 35, The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37, The male and female connectors allow the module to be connected at either end of a configuration. Power may be provided from the Printer Module 10 via the Serial Bus or from another source, such as a separate power module.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10 and the memory module 30.

A Flash Module 50 is shown in FIG. 5. The Flash Module 50 is used to generate a flash with flash cell 51 when taking photographs with the Camera Module 20, The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus or from another source, such as a separate power module.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
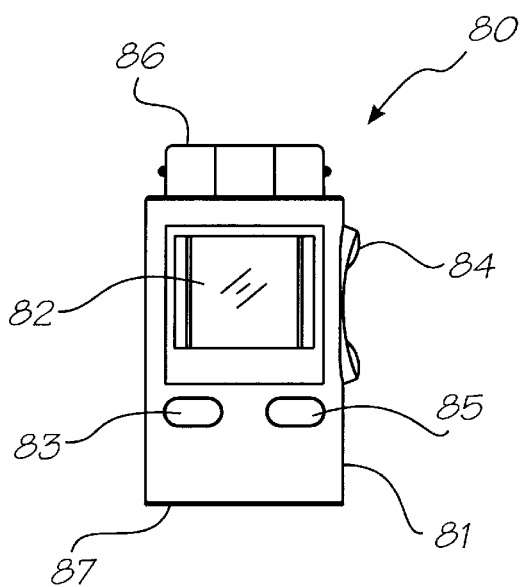
FIG. 8 is an effects module.

The Effects Module shown in FIG. 8 is an image processing module. It allows a user to select a number of effects and applies them to the current image stored in the Printer Module 10, The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
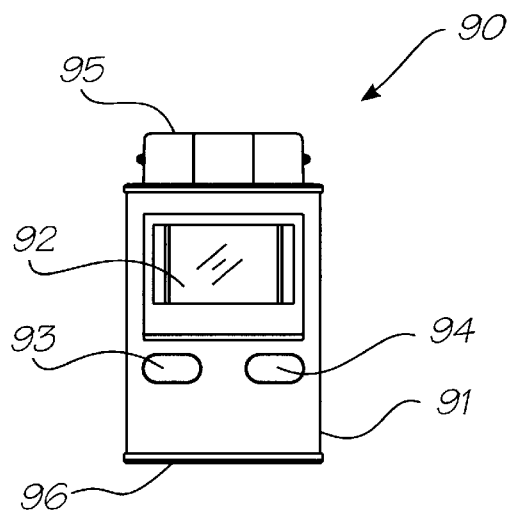
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
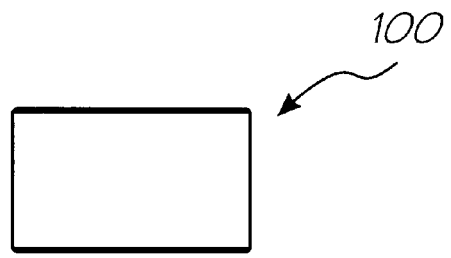
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
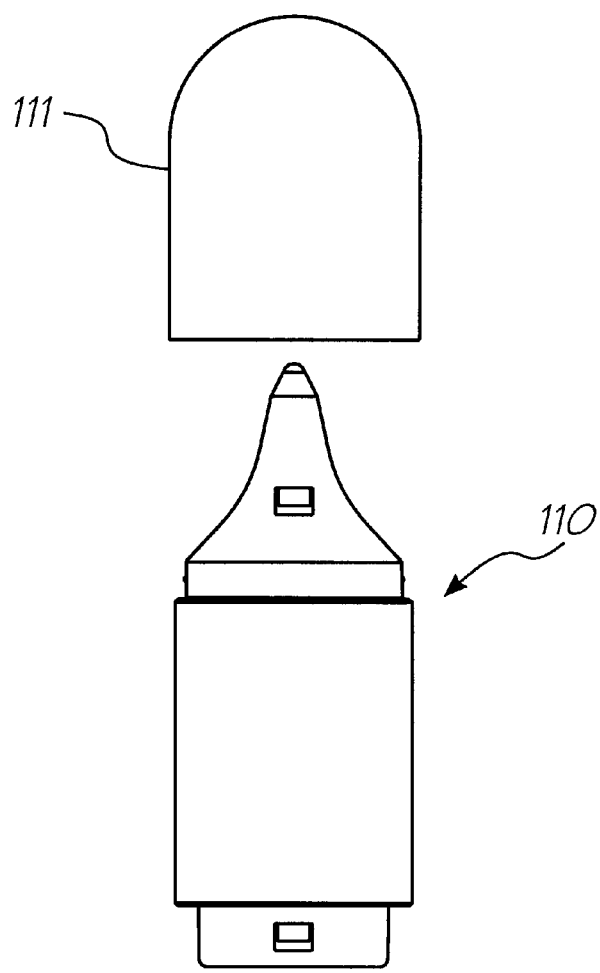
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
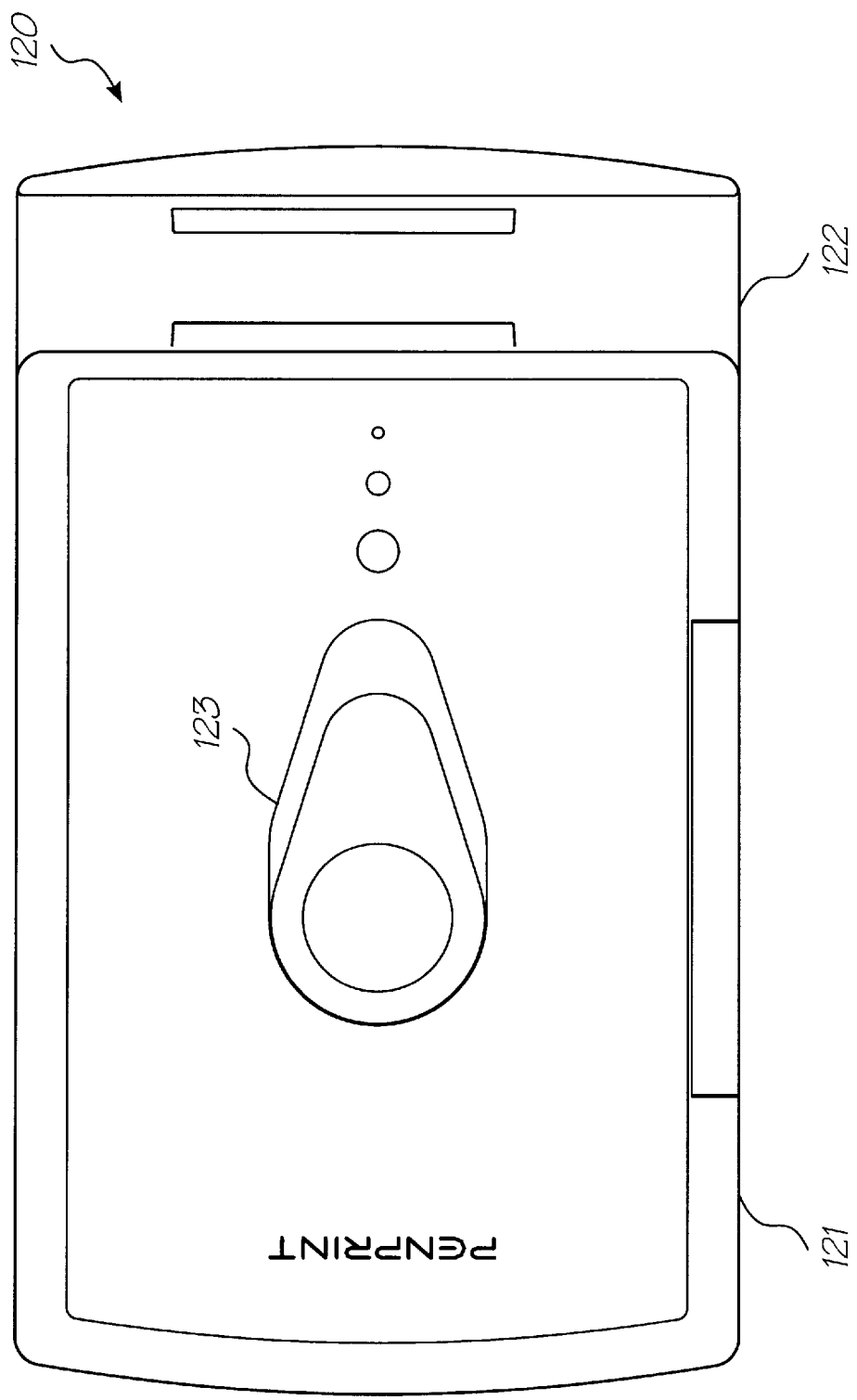
FIG. 12 is a dispenser module.

To assist with accurately feeding a business card sized print media into slot 13 of the printer module 10, a dispenser module 120 is provided as shown in FIG. 12, The dispenser module 120 comprises a body 121 that holds a store of business card sized print media. A Printer Module 10 locates, into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
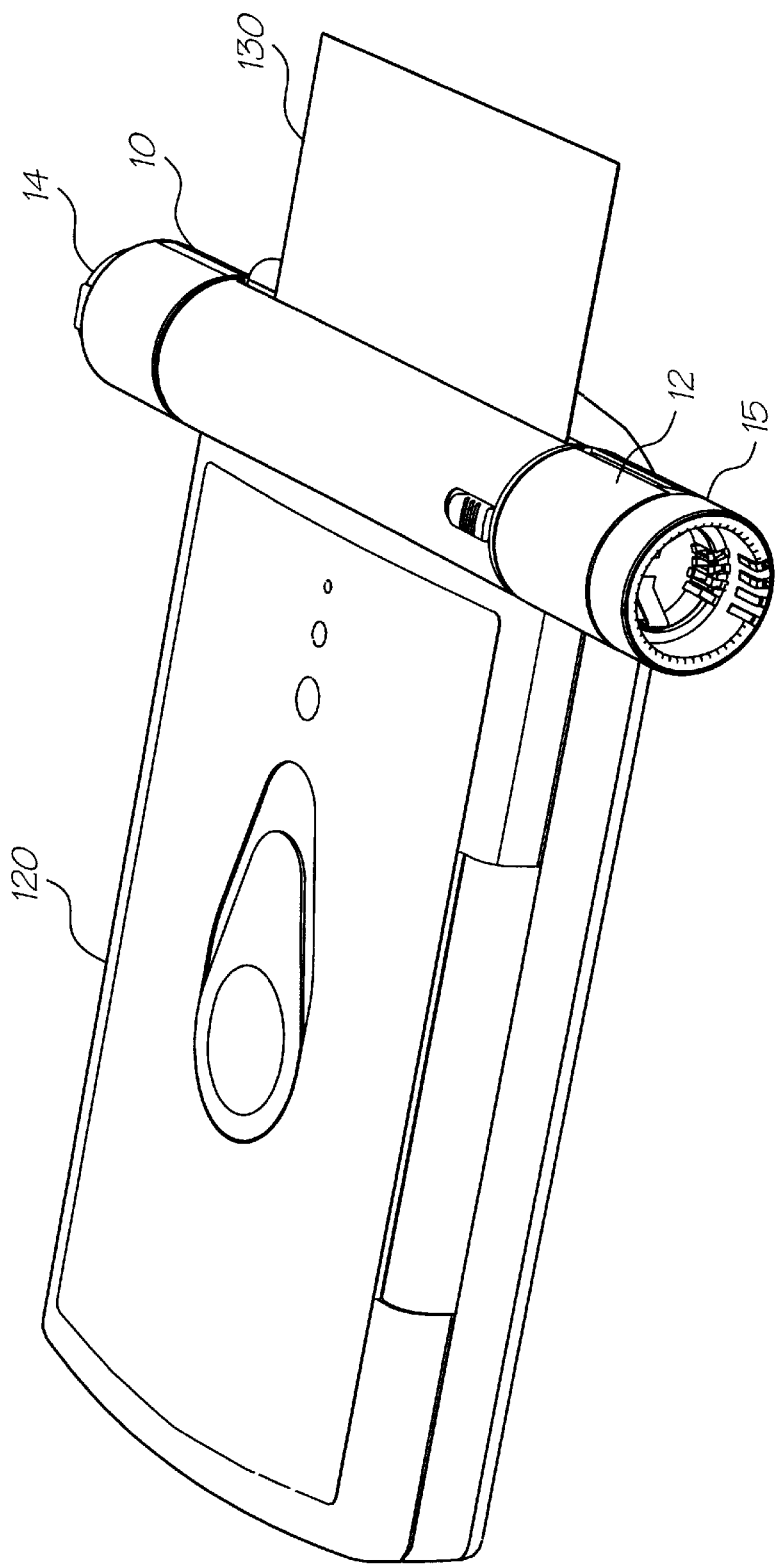
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
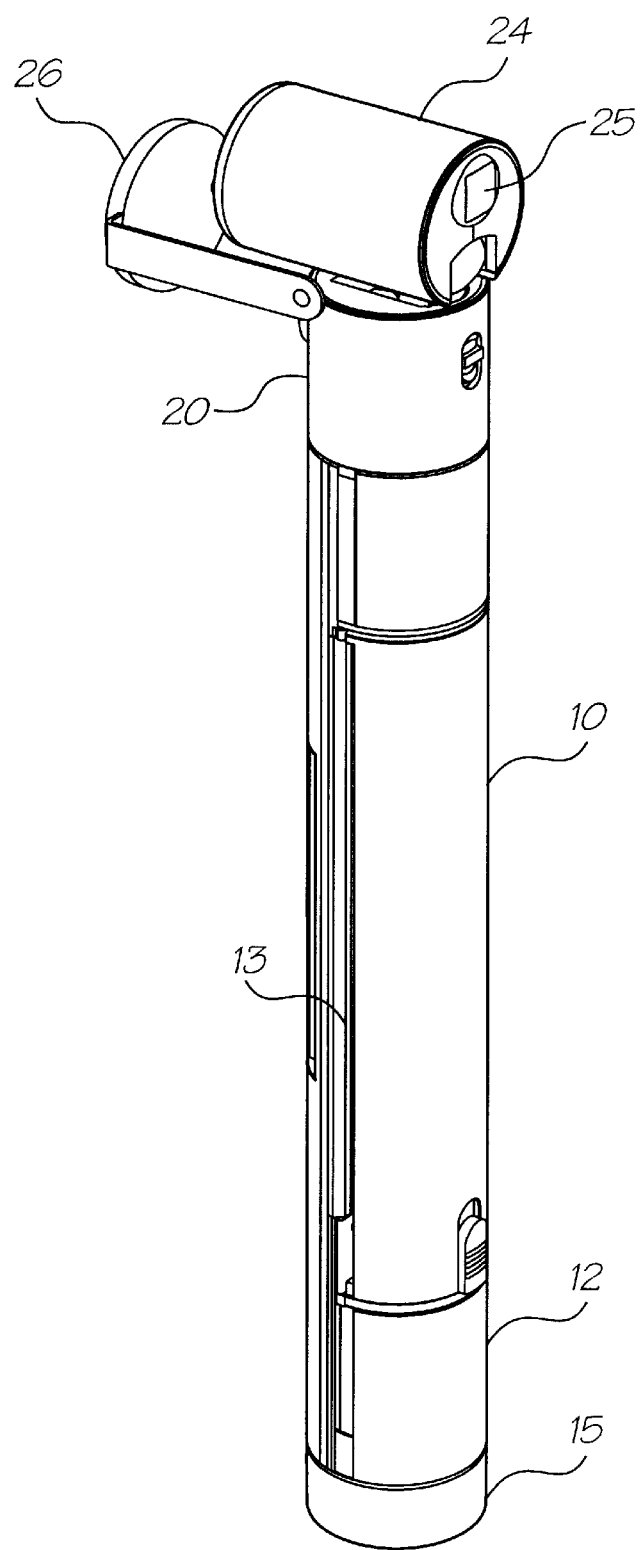
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
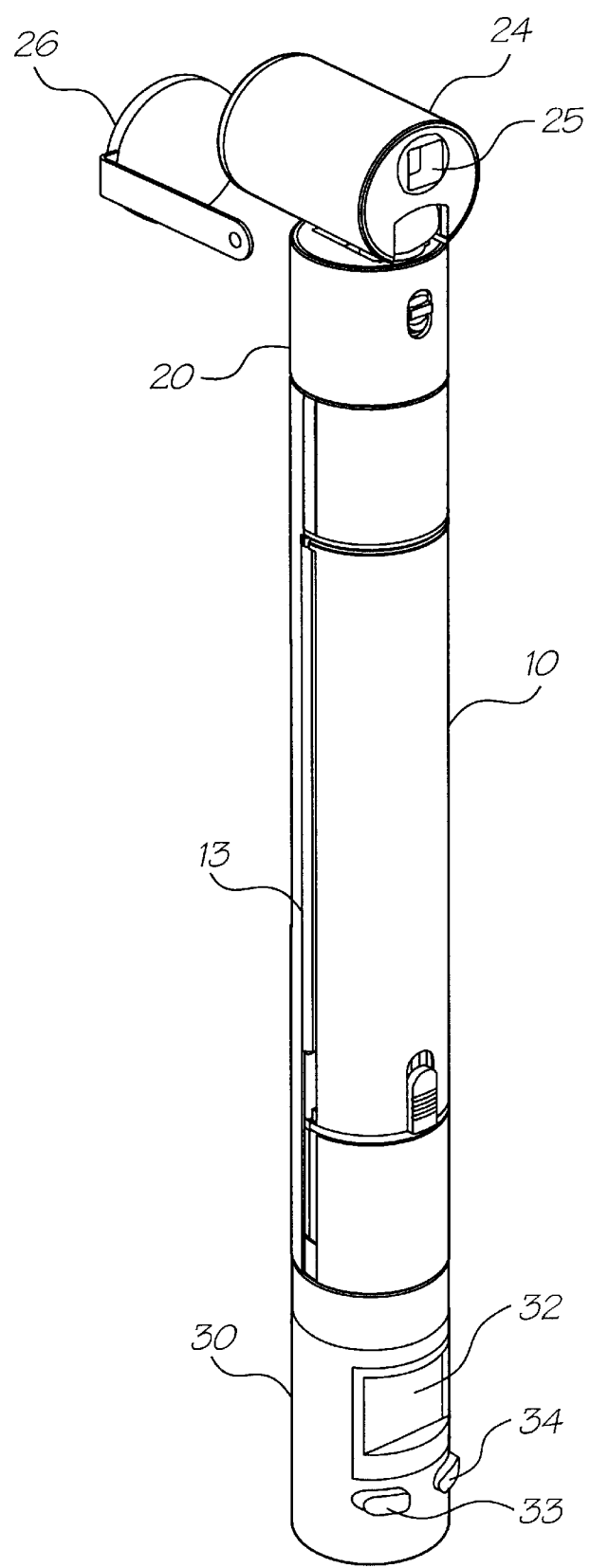
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
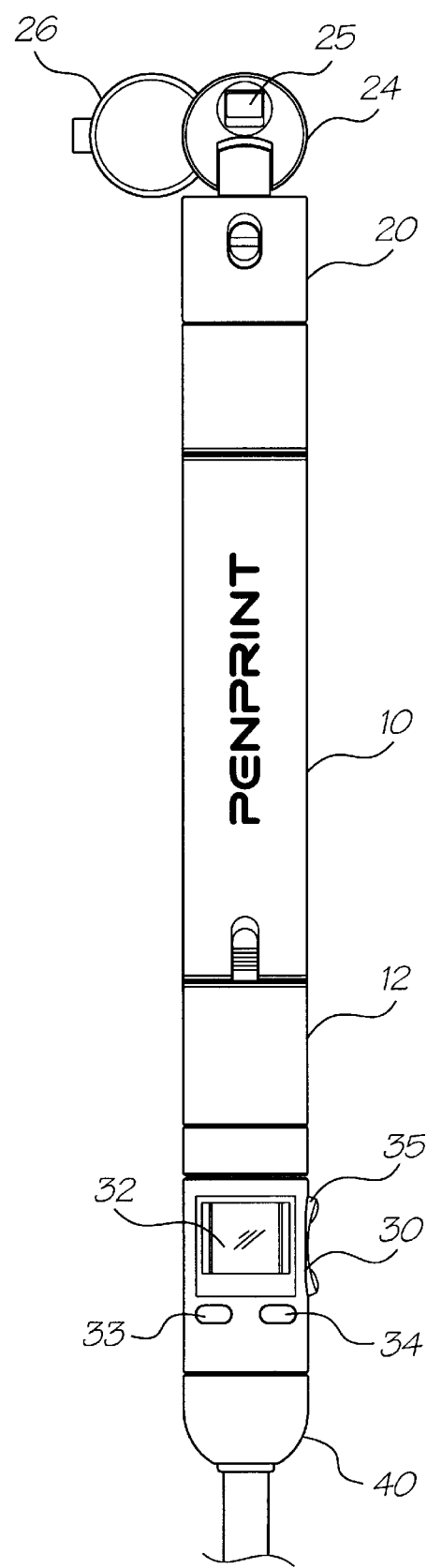
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

Each module is visible on the Serial Bus. Each module is self identifying and self-configuring using standard USB protocols. Apart from the standard protocol functions (including identification), there are a number of functions to which each module is also capable of responding. These are outlined in Table 1. Each module also has a number of module-specific functions. These commends allow the modules to be controlled by an external device, such as a personal computer, and by other modules.

TABLE 1

Basic Module Functions

| Name | Description |
| --- | --- |
| GetImageCounts( ) | Returns two counts - the number of images that can be read from the module, and the number of images that can be written to the module. This allows read only, write only, and virtual read only images. |
| GetCurrentImageNumber | If the module has a setting for tbe image number, this call returns the current image number. |
| GetImageAccessMethods | Returns two sets of 8 access bits. The first set represents the read access bits, and the second set represents the write access bits. See Table 2 for an interpretation of the bits. |
| GetImage(N, Mode) | Returns image number N using the specified 8-bit access mode. See Table 3 for an interpretation of the access mode bits. |
| StoreImage(N, Mode) | Stores an image at address N using the specified 8-bit access mode. See Table 3 for an interpretation of the access mode bits. |
| TransferImage(N1, Mode, Dest, N2) | Transfers the image at address N1 using the specified 8-bit access mode to the image at address N2 at the serial device with id Dest. See Table 3 for an interpretation of the access mode bits. |

The 8-bit mode returned by GetImageAccessMethods is interpreted as follows:

TABLE 2

8-bit return code from GetImageAccessMethods

| Bit | Interpretation |
| --- | --- |
| 0 | Access 850 × 534 permitted |
| 1 | Access 534 × 850 permitted |
| 2 | Interleaved L*a*b* permitted |
| 3 | Planar L*, a*, b* permitted |
| 4–7 | Reserved, and 0 |

The 8-bit mode used for image read and write access via GetImage, StoreImage and TransferImage is interpreted as follows:

TABLE 3

8-bit code used for read & write access

| Bit | Interpretation |
|---|---|
| 0 | Orientation: 0 = 850 × 534, 1 = 534 × 850 |
| 1 | 0 = interleaved, 1 = planar |
| 2–3 | Color plane (valid only when bit 1 = planar)<br>00 = L*,01 = a*,10 = b*,11 = reserved |
| 4–7 | Reserved, and 0 |

In some situations, certain modules may be configured without the printer module. For example, it may be convenient to configure a camera module 20 and a memory module 30 for capturing and storing images for later printing by the printer module 10. The timer module 60 and the flash module 50 may be added to the camera module 20 and memory module 30 to produce a digital camera having many of the features of a conventional camera. Additional memory modules can easily be added to provide virtually unlimited memory storage.

The above commands allow images to be transferred to and from the modules without going through the printer module. For example, the Memory Module 30 can act under control of the Timer Module 60 to transfer a captured image from the Camera Module 20 to the Memory Module 30 using the TransferImage command. The Camera Module 20 will have a module specific 'capture' command for capturing an image.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

The Memory Module 30 is a standard module used for storing photographic images. The memory module stores 48 images, each of which can be accessed either at full resolution or at thumbnail resolution. Full resolution provides read and write access to individual images, and thumbnail resolution provides read access to 16 images at once in thumbnail form.

Figure 17:
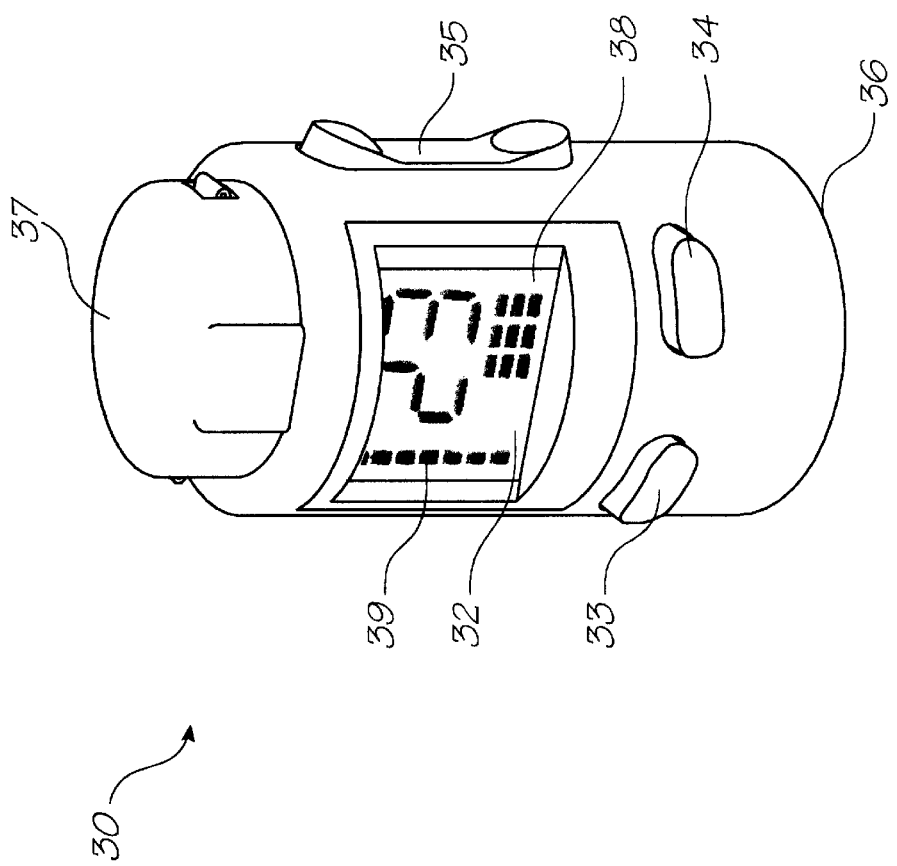
FIG. 17 is a perspective view of the memory module.

FIG. 17 shows a magnified perspective view of the Memory Module 30, as previously described with reference to FIG. 3. An optional LCD 32 provides visual feedback. It contains a 2-digit numerical display representing the image number. An icon 38 below the number is visible when thumbnails are selected, and a series of block segments 39 are also present to provide feedback during image transfer. As shown in FIG. 17, LCD 32 is showing all segments active. The LCD is optional as visual feedback can be provided by a LCD in another module from information transmitted on the Serial Bus.

Figure 18:
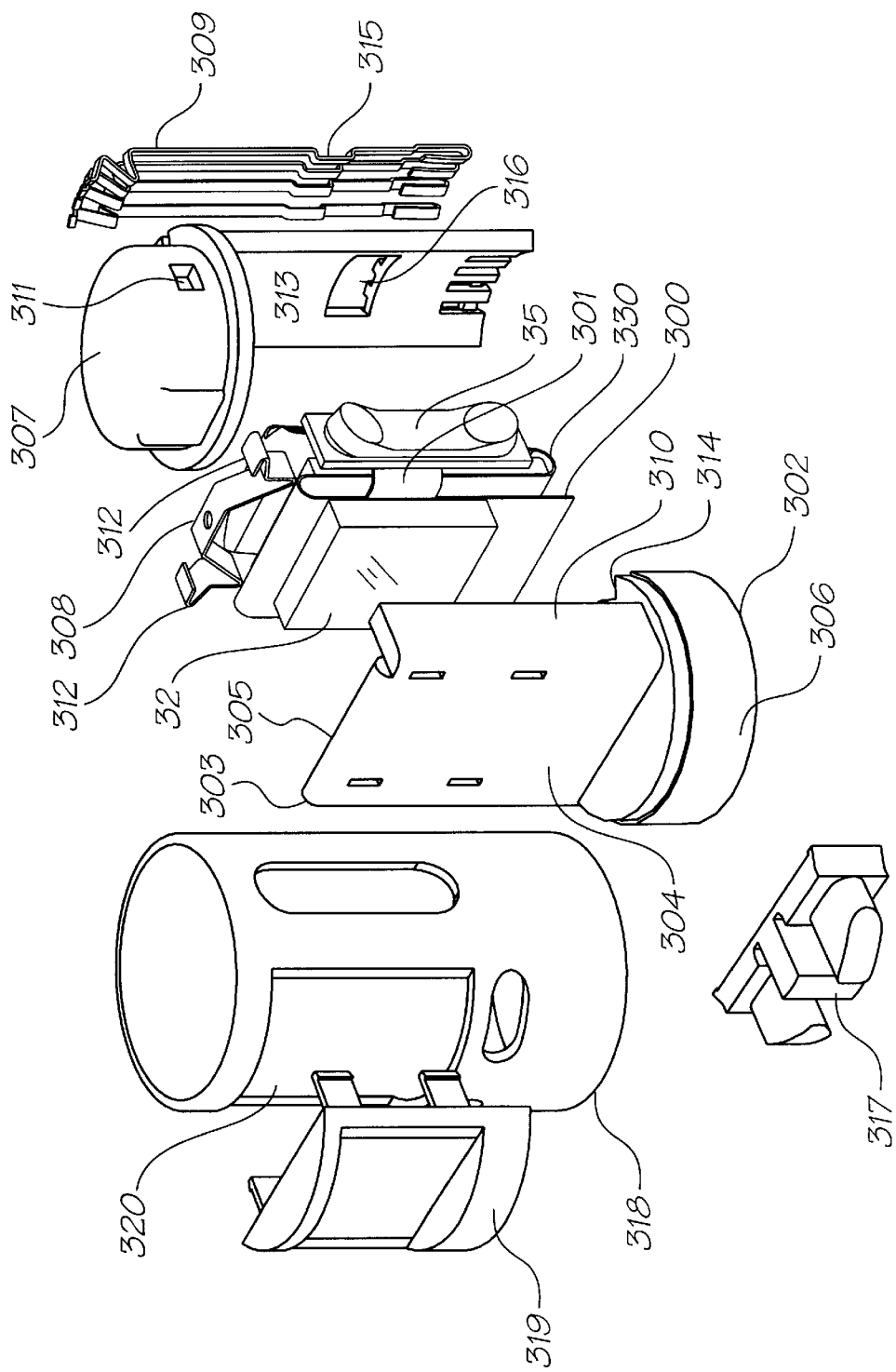
FIG. 18 is an exploded view of the memory module.
Figure 19:
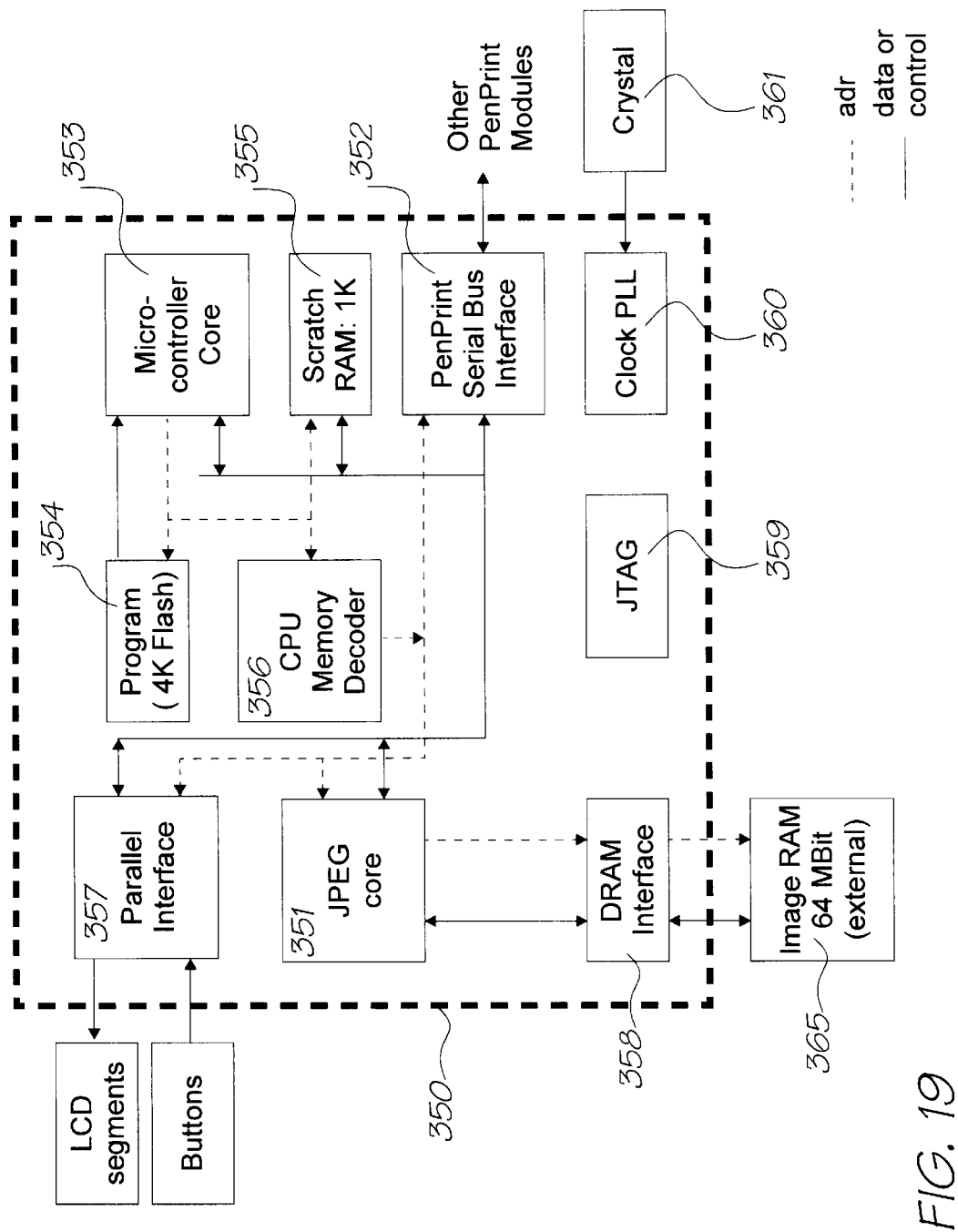
FIG. 19 is a block schematic diagram of an image processor for the memory module.

FIG. 18 is an exploded perspective view of the Memory Module 30, The LCD 32 is mounted on a flexible printed circuit board (PCB) 300, With reference to FIG. 19, also formed on the PCB 300 is an image processor which is suitably an application specific integrated circuit (ASIC) 350 and a 64 MBit (8 MB) Flash memory 365 for image storage. ASIC 350 and Flash memory 365 are depicted as a unit 330 in FIG. 18.

In reference to FIG. 18, the SELECT button 35 is a double button and operates in the manner of a known rocker switch to increment or decrement the image number. Selections made using the SELECT button 35 are communicated to the PCB 300 via contact 301.

The flexible PCB 300 is mounted on a support 303 of chassis molding 302. In the preferred embodiment the PCB 300 is mounted such that the LCD 32 lies substantially parallel with a front face 304 of the support 303. The flexible PCB 300 passes over the support such that the ASIC and the Flash memory unit 330 lies substantially parallel with a back face 305 of the support 303. The flexible PCB 300 passes under the unit 330 and extends away from the base 306 of the chassis molding 302.

The contact 301 conforms to a curved edge of the support 303 allowing the base of SELECT button 35 to lie substantially parallel with a side face 310 of the support.

The male bayonet connector 37 comprises a cap molding 307, a latch strip 308 and a plurality of contact strips 309, The upper end of the cap molding is essentially dome-shaped and comprises two holes 311 positioned diametrically opposite each other. The holes 311 are positioned and shaped to receive the folded ends 312 of latch strip 308.

The lower end of the cap molding 307 comprises an elongated section 313 that is shaped to carry contact strips 309. The contact strips extend from the upper end of the cap molding, where they form part of the male connector 37, to the bottom of the elongated section 313. The bottom of the elongated section fits into a recess 314 in the base 306 of the chassis molding such that the contact strips 309 form part of the female bayonet connector 36.

Raised portions 315 of the contact strips 309 fit into an aperture 316 in the elongated section 313 of the cap molding. Contacts on the flexible PCB 300 mate with the raised portions 315 to make contact with the Serial Bus.

The IN button 33 and the OUT button 34 are incorporated in a molding 317. A contact in the base of the molding for each button connects with the PCB 300 when one or other of the buttons is pressed.

The internal components of the Memory Module 30 are contained within a metal extrusion 318 that comprises a plurality of apertures. It is clear from FIG. 18 the manner in which the buttons 33, 34 and 35, and the male connector 37 protrude from the extrusion through the associated apertures to perform their function.

A fascia molding 319 clips into the aperture 320 and provides a protective cover for the LCD 32.

The Memory Module 30 connects to a compact printer configuration via the male connector 37 or the female connector 36. Either the male or the female bayonet connector joins the Memory Module to the Serial Bus via contact strips 309. Power is provided to the Memory Module from the Printer Module 10 via the Serial Bus.

Alternatively, the Memory Module may be connected to a compact printer configuration via both the male and female bayonet connectors. An example of this principle is shown in FIG. 16 where the Memory Module 30 is connected to the Printer Module 10 via its male connector and is connected to the Communications Module 40 via its female bayonet connectors.

The Memory Module may also be connected directly to the Camera Module to store images captured by an image sensor in the Camera Module. The Memory Module may then be connected to the Printer Module at a later time to print the captured images. A separate power module will need to be connected to provide power.

Three buttons operate the Memory Module and feedback is given via a LCD. The two principal operations are to transfer an image to the Printer Module 10, or to read an image from the Printer Module or the Camera Module. In both cases, the LCD displays the number of the image read or sent.

The SELECT button 35 changes the image number on the LCD display. The numbers simply cycle between 1 and the storage capacity of the Memory Module, followed by a number of thumbnail sets (1 to n, 1 for each 16). In a Memory Module that stores 48 images the numbers cycle between 1 and 48, followed by 1 to 3. While the thumbnail number is being shown, the LCD thumbnail icon 38 is also displayed.

Pressing the OUT button 34 sends the current image number (or thumbnail set) to the Printer Module 10. Pressing the IN button 33 loads the image from the Printer Module or Camera Module into the named module. If the current setting is a thumbnail number the IN button does nothing.

A small animation takes place during the transfer process to let the user know that the image transfer is taking place. The animation consists of a number of small black segments 39 being enabled on the left side of the LCD showing the proportionate amount of data successfully transferred. The visual effect is that of a thermometer style status bar. The transfer time and animation time is approximately 1.5 seconds, but the status bar is important for user feedback.

The Memory Module 30 is also visible on the Serial Bus as an image storage device. This enables the Memory Module to be controlled externally, either as a source or a destination for images. The USB Module 40 makes any present Memory Modules visible to an external computer system, allowing the download or upload of images to each one.

When multiple Memory Modules are present in a configuration, they are each controlled individually by the user. The operation of one Memory Module does not interfere with another.

Since each module can be controlled by a computer or by another module, it is possible to attach a module that makes specific use of a Memory Module 30. One example of this kind of module is the Timer Module 60 which is described in detail in a co-pending application titled Timer Module for Compact Printer System.

The Memory Module provides a black-box storage mechanism for images. Any proprietary image storage format can be used, or changed over time since the stored image format is not externally available. Since memory storage for multiple images is still somewhat expensive, image compression is used. Thus, the Memory Module contains 2 chips as mentioned earlier. The Memory Module contains 64 MBit (8 MB) Flash memory 365 for image storage and controlling image processor 350 with on-board image compression hardware. The number of images that can be stored in the 64 MBit Flash memory is directly tied to the specific compression mechanism used.

The storage of images in the memory module will now be described. Uncompressed, an image requires 1.3 MB (850× 534×3 bytes=1,361,700 bytes). A 64 MBit DRAM would only be able to store 6 images. We therefore use JPEG compression to compress the contone data. Although JPEG is inherently lossy, for compression ratios of 10:1 or less the loss is usually negligible (Wallace, G. K., "The JPEG Still Picture Compress-on Standard", Communications of the ACM, 34 (4), April 1991, pp. 30–44). This yields a contone image size of 130 KB, allowing the storage of between 50 and 60 images.

The JPEG compression algorithm (ISO/IEC 19018-1:1994, Information technology—Digital compression and coding of continuous-tone still images: Requirements and guidelines, 1994) compresses a contone image at a specified quality level in a lossy manner. It introduces imperceptible image degradation at compression ratios below 5:1, and negligible image degradation at compression ratios below 10:1 (Wallace, G. K., "The JPEG Still Picture Compression Standard", Communications of the ACM, 34 (4), April 1991, pp. 30–44).

JPEG typically first transforms the image into a color space that separates luminance and chrominance into separate color channels. This allows the chrominance channels to be sub-sampled without appreciable loss because of the human visual system's relatively greater sensitivity to luminance than chrominance. After this first step, each color channel is compressed separately.

The image is divided into 8×8 pixel blocks. Each block is then transformed into the frequency domain via a discrete cosine transform (DCT). This transformation has the effect of concentrating image energy in relatively lower-frequency coefficients, which allows higher-frequency coefficients to be more crudely quantized. This quantization is the principal source of compression in JPEG. Further compression is achieved by ordering coefficients by frequency to maximize the likelihood of adjacent zero coefficients, and then run-length-encoding runs of zeroes. Finally, the runlengths and non-zero frequency coefficients are entropy coded. Decompression is the inverse process of compression.

Images in the compact printer system of the invention are in the L*a*b* color space as described earlier, and are therefore already separated into luminance and chrominance channels. It is quite reasonable for the luminance channel to use one set of Huffman tables, and the chrominance channels to share another set. In addition, the chrominance channels can be sub-sampled. Finally, it should be noted that the images have a fixed resolution of 850×534. Any JPEG implementation can therefore be tailored to this resolution and does not have to be general.

At the end of compression, a JPEG byte stream is complete and self-contained. It contains all data required for decompression, including quantization and Huffman tables.

A low complexity ASIC 350 provides the processing power of the Memory Module. The elements of the ASIC are shown in FIG. 19. The ASIC includes a JPEG core 351, a Serial Bus interface core 352, a microcontroller core 353, a small amount of program ROM 354 and a small amount of RAM 355 for program scratch.

Also included in the ASIC is a memory decoder 356, parallel interface 357 (that communicates with the LCD and various buttons) and a memory interface 358. A Joint Test Action Group unit 359 may be included for self-test purposes. In some circumstances a clock 360 and crystal oscillator 261 may be required.

Although an ASIC is shown in the embodiment, it is envisaged that alternatives known in the art, such as VLSI, may be used to configure the image processing chip.

Images from the Memory Module 30 must be made available in both planar and interleaved formats. How this is accomplished will depend on the ability of the JPEG core 351. If the core is only capable of compressing/decompressing a single channel at once, limited buffering may be required.

The combination of the Memory Module 30 with the Printer Module 10 constitutes a minimum compact printer system that allows one or more images stored in the Memory Module to be printed. This combination also allows an image stored in the Printer Module 10 to be stored in the Memory Module 30. The combination of the Memory Module 30 with a Camera Module 20 constitutes a digital imaging system. This combination allows an image captured by the Camera Module to be stored in the Memory Module.

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

What is claimed is:

1. A memory module for a compact printer system comprising:
   a body directly connectable to the compact printer module, said printer module comprising an elongate body having a length just larger than a length of a side of a business card such that said business card passes through said compact printer module for printing thereon, said body being substantially shorter than said compact printer module;
   memory means within said body for storing images;
   an image processor within said body that transfers one or more images from said memory means or to said memory means from an image source external to said body; and
   at least one connection means incorporated in said body that directly connects said memory module to said compact printer module, said connection means including a bus providing power and data between said memory module and said image source.

2. The memory module of claim 1 having two or more connection means incorporated in said body, at least one connection means connecting said memory module to at least said image source.

3. The memory module of claim 1 having two or more connection means incorporated in said body including a first connection means connectable to said image source and a second connection means connectable to further memory modules in a stackable manner.

4. The memory module of claim 1 having two or more connection means incorporated in said body, said two or more connection means providing through connection to said image source and one or more further modules of said compact printer system.

5. The memory module of claim 1 wherein said image processor includes compression means for compressing said one or more images before storing said image in said memory means.

6. The memory module of claim 5 wherein compression means performs decompression of said image when transferring said image from said memory means.

7. The memory module of claim 5 wherein said compression means is a JPEG compression unit.

8. The memory module of claim 1 wherein said image source is a camera module of a compact printer system.

9. The memory module of claim 1 wherein said image source is said printer module of a compact printer system.

10. The memory module of claim 1 wherein said images stored in said memory means can be accessed at full resolution or at thumbnail resolution.

11. The memory module of claim 1 further comprising a LCD within said body connected to said image processor and providing information about said stored images.

12. The memory module of claim 11 wherein said LCD is capable of displaying a plurality of icons indicative of image reference number, image type and image transfer status.

13. The memory module of claim 1 wherein said memory means is an 8 MB flash memory.

14. The memory module of claim 1 wherein said at least one connection means comprises a male bayonet fitting providing physical connection between said memory module and said image source.

15. The memory module of claim 1 wherein said at least one connection means comprises a female bayonet fitting providing physical connection between said memory module and said image source.

16. The memory module of claim 1 further comprising a SELECT button to increment or decrement an image reference number.

17. The memory module of claim 1 further comprising an IN button to load an image from said image source into said memory module.

18. The memory module of claim 1 further comprising an OUT button to send a current image or thumbnail set of images on said bus.

19. The memory module of claim 1 wherein said bus is a Serial Bus.

20. The memory module of claim 1 wherein said bus enables said memory module to be controlled externally allowing the download or upload of images from/to said memory module.

21. The memory module of claim 1 wherein said image processor is an application specific integrated circuit.

22. A memory module for a compact printer system comprising;

a body directly connectable to the compact printer module, said printer module comprising an elongate body having a length just larger than a length of a side of a business card such that said business card passes through said compact printer module for printing thereon, said body being substantially shorter than said compact printer module;

memory means within said body for storing images;

an image processor within said body connected to said memory means that transfers one or more images from an image source external to said body to said memory means and transfers one or more stored images from said memory means to said printer module;

at least one connection means at an end of said body that directly connects said memory module to said compact printer module, said connection means including a bus providing power and data between said memory module, said image source and said printer module.

23. The memory module of claim 22 having two or more connection means incorporated in said body including a first connection means connectable to said printer module and a second connection means connectable to further memory modules in a stackable manner.

* * * * *